Feb. 24, 1942.  R. C. BOYER  2,274,232
ROTARY MOTOR
Filed Oct. 30, 1940   4 Sheets-Sheet 1

Inventor
Roy C. Boyer
By Clarence A. O'Brien
Attorney

Feb. 24, 1942.   R. C. BOYER   2,274,232
ROTARY MOTOR
Filed Oct. 30, 1940   4 Sheets-Sheet 2

Inventor
Roy C. Boyer
By Clarence A. O'Brien
Attorney

Feb. 24, 1942.   R. C. BOYER   2,274,232
ROTARY MOTOR
Filed Oct. 30, 1940   4 Sheets-Sheet 3
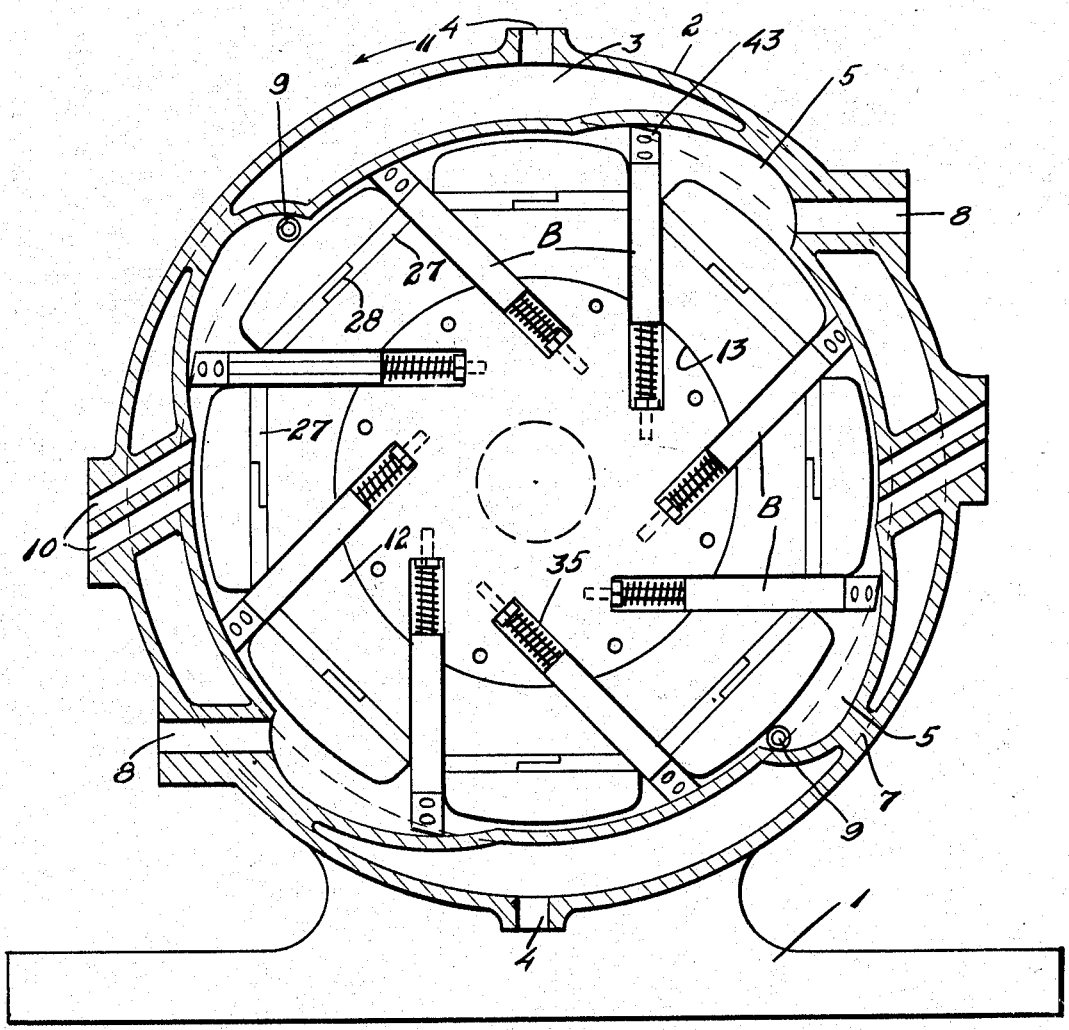
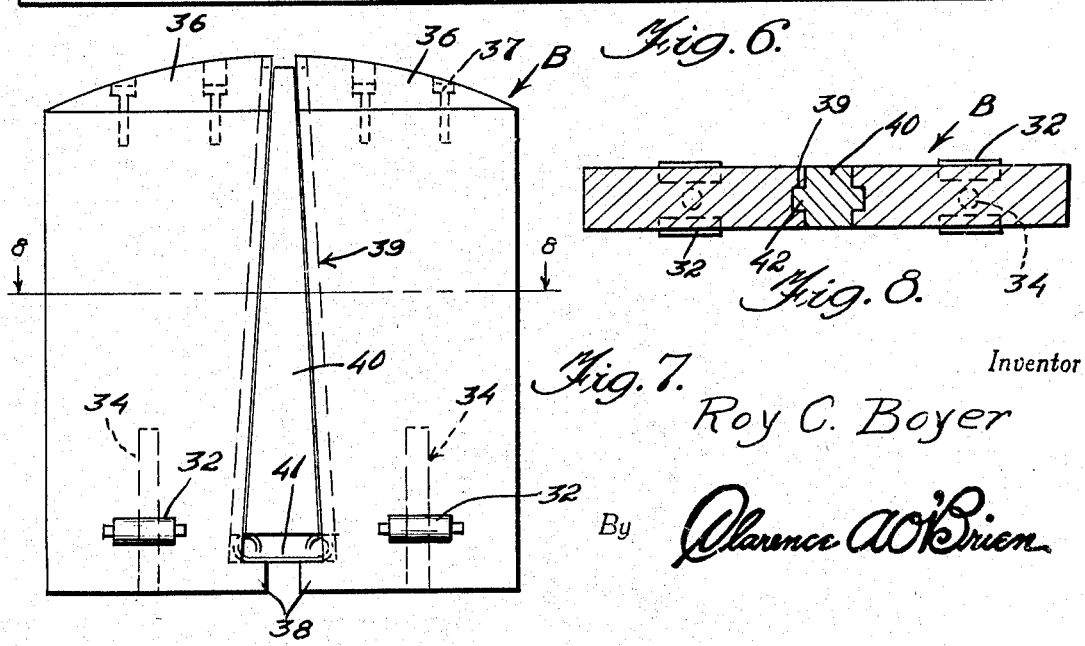
Inventor
Roy C. Boyer
By Clarence A. O'Brien Feb. 24, 1942.    R. C. BOYER    2,274,232
ROTARY MOTOR
Filed Oct. 30, 1940    4 Sheets-Sheet 4
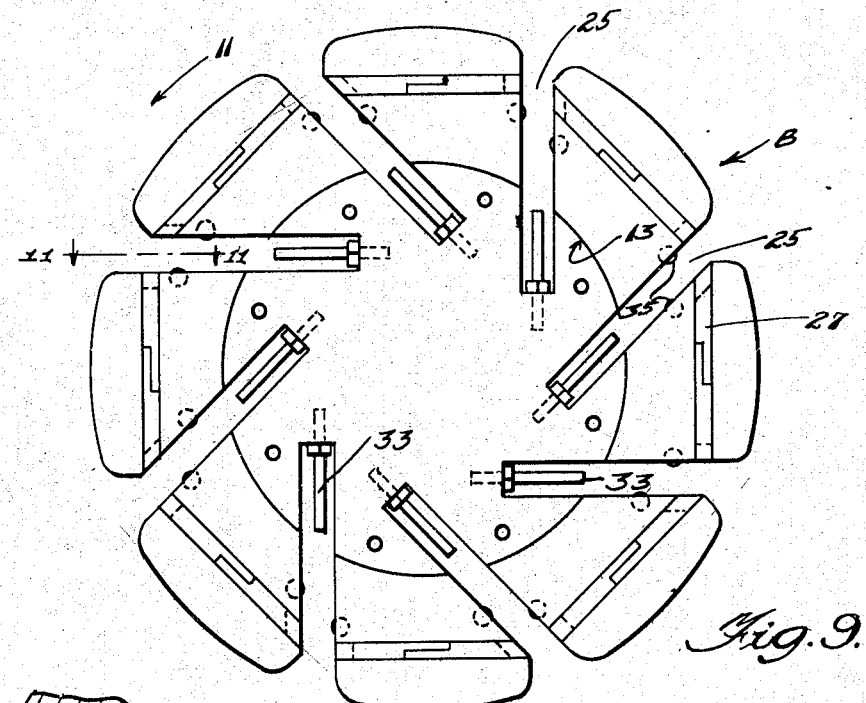
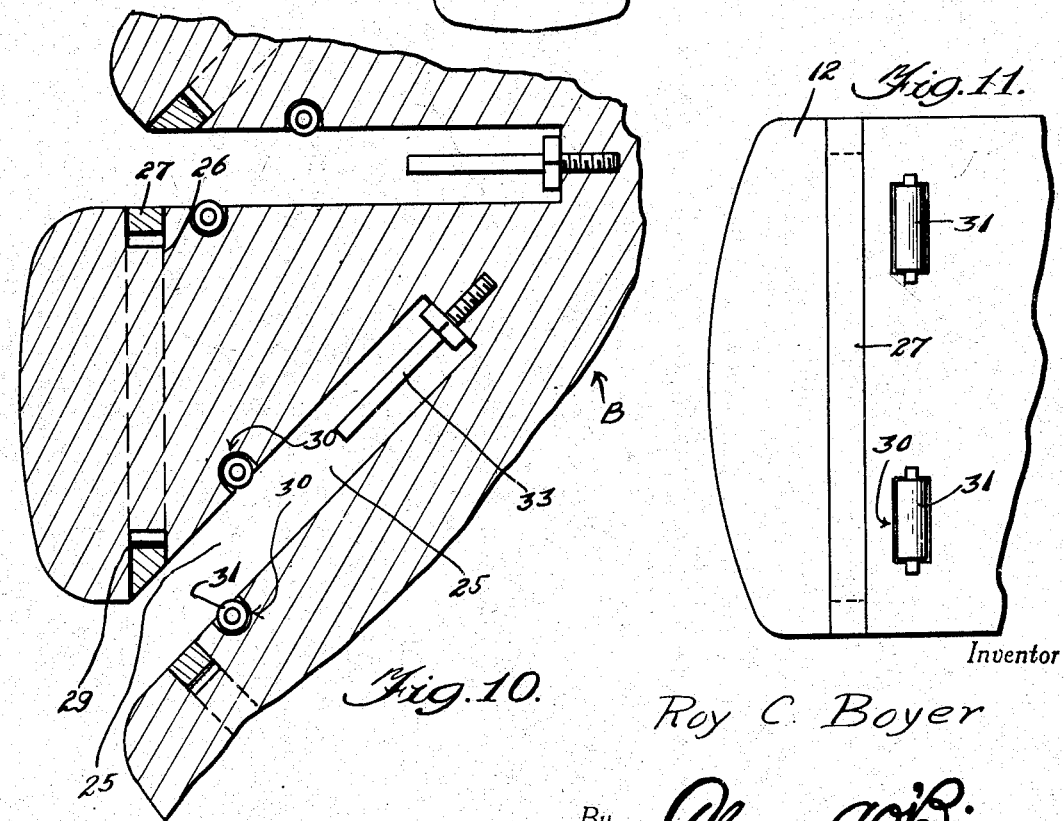
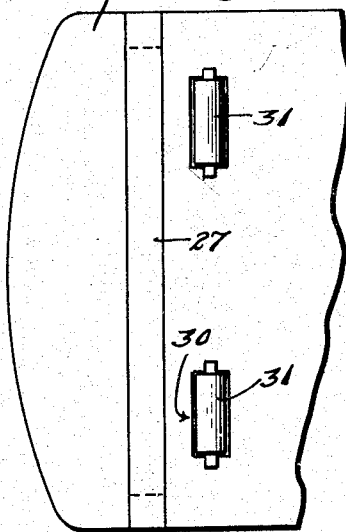
Inventor
Roy C. Boyer
By Clarence A. O'Brien
Attorney Patented Feb. 24, 1942

2,274,232

UNITED STATES PATENT OFFICE 2,274,232

ROTARY MOTOR

Roy C. Boyer, Kansas City, Mo.

Application October 30, 1940, Serial No. 363,558

2 Claims. (Cl. 123—16)

This invention relates to a rotary motor, the general object of the invention being to provide a motor which can be constructed at low cost and will operate with a maximum efficiency with a minimum amount of fuel and will run smoothly at both high and idling speeds.

Another object of the invention is to provide a rotor with spring pressed blades therein, with means for holding compression between the blades so that leakage in the space formed by each pair of blades is reduced to a minimum, with means for automatically taking up wear between the blades and the parts which they engage.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 6 is a section on the line 6—6 of Figure 2.

Figure 7 is a face view of one of the blades.

Figure 8 is a section on the line 8—8 of Figure 7.

Figure 9 is a view of the rotor with the blades removed therefrom.

Figure 10 is an enlarged fragmentary sectional view of the rotor with the blades removed therefrom.

Figure 11 is a section on the line 11—11 of Figure 9.

Figures 1, 2:
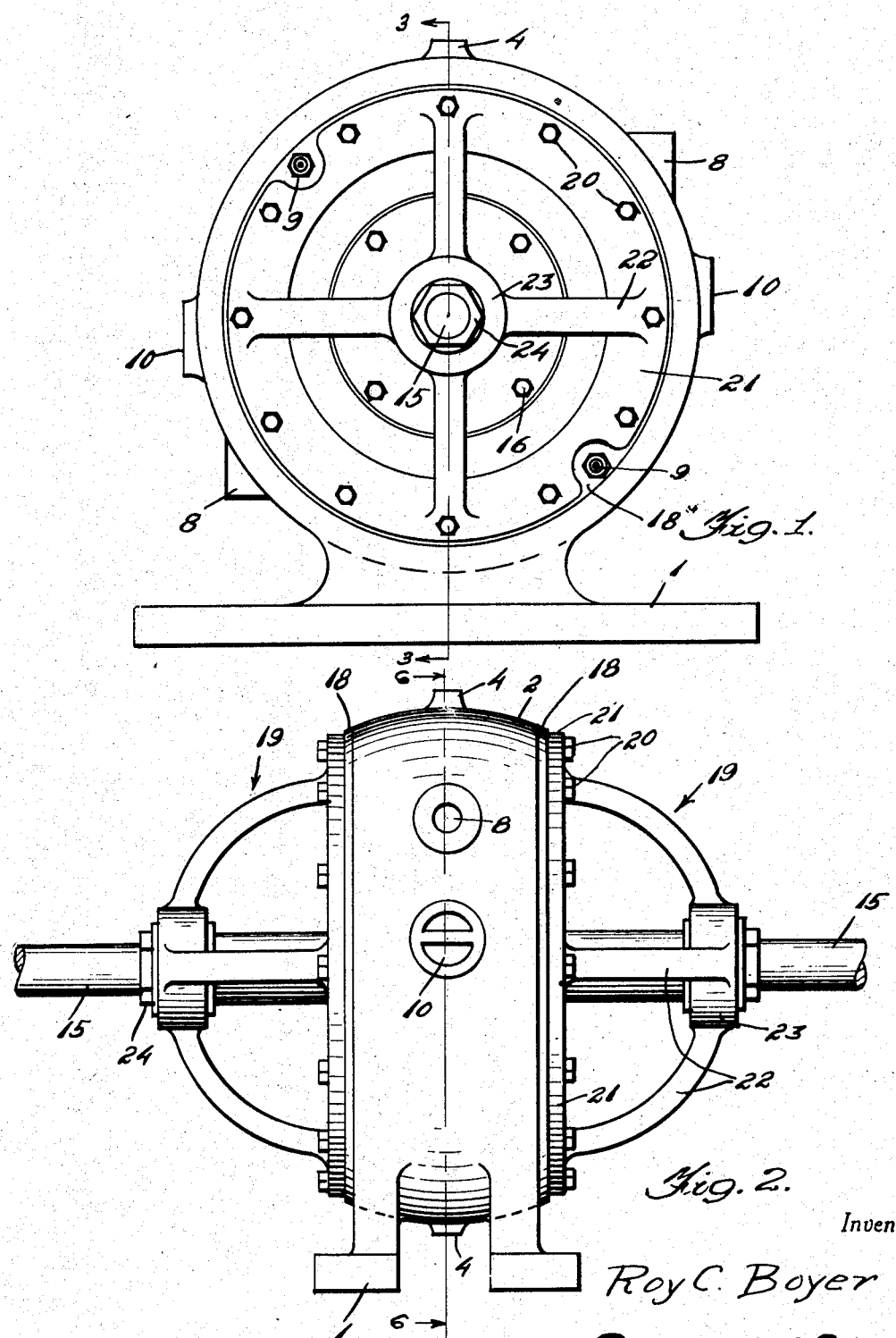
Figure 1 is an elevational view of the motor.
Figure 2 is an edge view thereof.

In these views the numeral 1 indicates the base of the motor and the numeral 2 indicates a vertically arranged housing, the lower part of which is connected with the base and the inner circumference of this housing is of arcuate shape in cross section to provide a curved wall for engagement by the curved outer ends of the blades. This housing contains a water chamber 3 of annular formation and which is located between the inner and outer walls of the housing, the inlet and outlet ports for this chamber being shown at 4. A plurality of pockets 5 is formed in the inner circumference of the housing and each pocket has an enlarged front end with the pocket gradually decreasing in depth to its rear end where it merges with the inner wall of the housing as shown more particularly in Figure 6. Portions of the pocket forming parts of the inner wall join the outer wall as shown at 7 but these junction parts are not wide enough to entirely close the water chamber at these points, as shown in dotted lines in Figure 6. Fuel inlet passages 8 communicate with some of the pockets and the remaining pockets have spark plugs 9 extending thereinto at the front ends thereof. As shown each pocket 5 which receives an explosive mixture from an inlet passage 8 is followed by another pocket having a spark plug therein. A pair of sloping exhaust passages 10 are in communication with the interior of the housing between a spark plug pocket and a fuel receiving pocket, these exhaust passages sloping in the direction of movement of the rotor which is in an anti-clockwise direction as shown by the arrow 11 in Figure 6.

Figure 3:
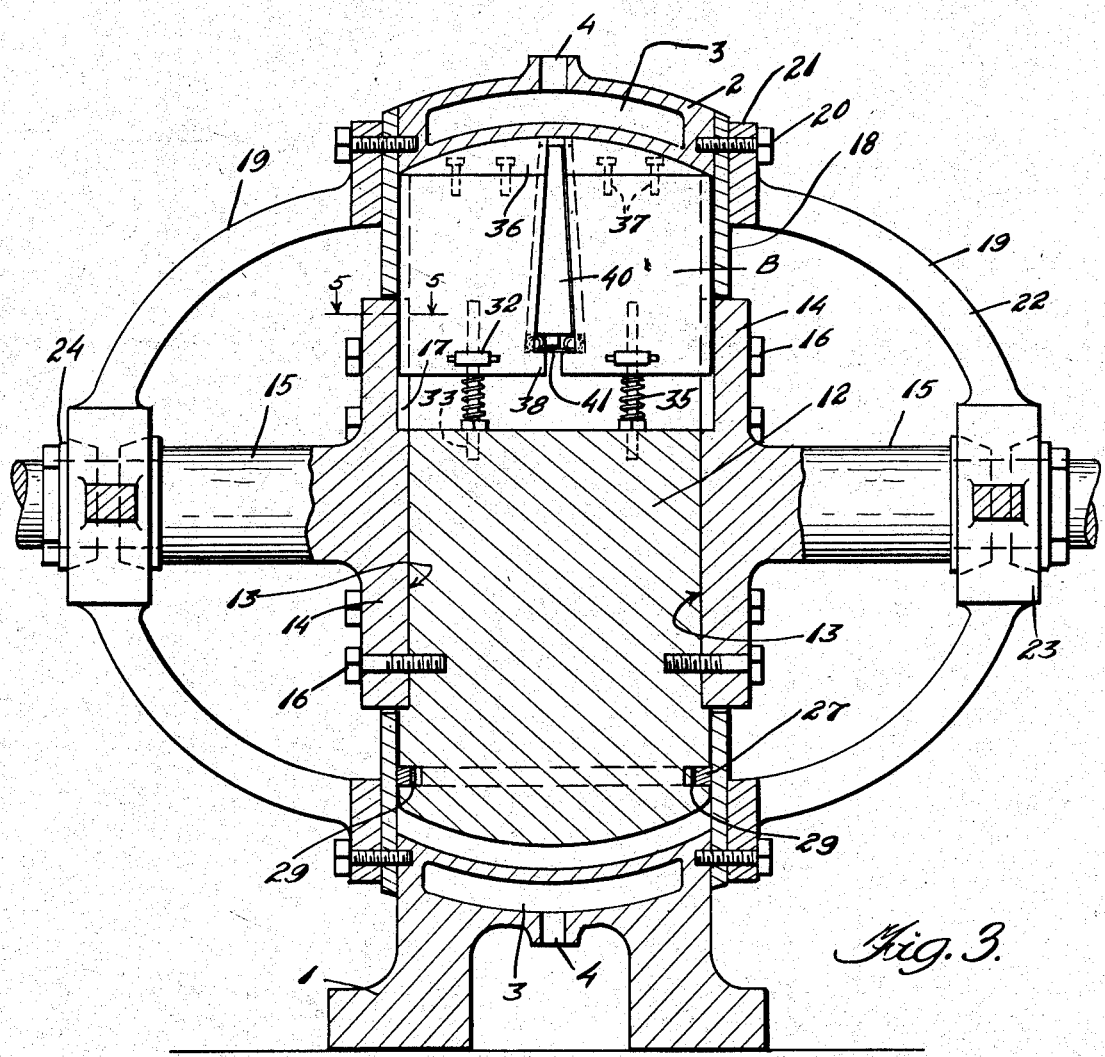
Figure 3 is a section on the line 3—3 of Figure 1.
Figure 4:
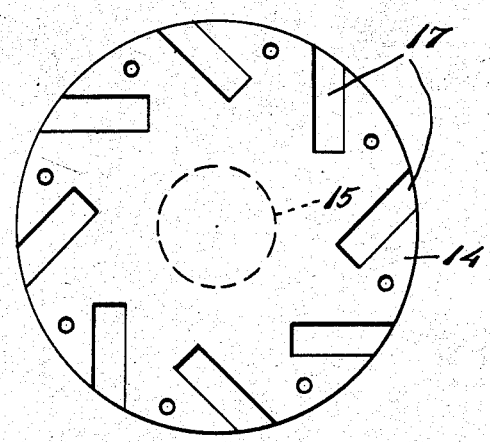
Figure 4 is a view looking toward the inner face of a flange of a shaft.
Figure 5:
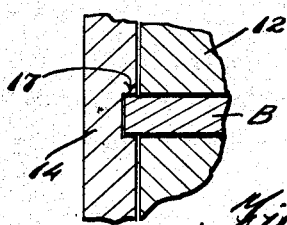
Figure 5 is a section on the line 5—5 of Figure 3.

The rotor is shown at 12 and is located in the housing, said housing having its ends open and the rotor has circular recesses 13 in its sides for partially receiving the flanges 14 formed on the inner ends of the shafts 15, the flanges being bolted to the rotor by the bolts 16. Each flange has a plurality of substantially tangentially arranged grooves 17 in its inner face, as shown in Figure 4. Ring-shaped side plates 18 are bolted to the side edges of the housing and have their inner circumferences arranged adjacent the peripheries of the flanges 14 and substantially dome-shape end members 19 are fastened to the outer portions of the plates 18 by the bolts 20 which also hold the plates 18 in position. Each end member is composed of a ring 21, inwardly curved bars 22 and a ring-shaped bearing member 23 connected with the outer ends of the bars and through which the shafts 15 pass, suitable anti-friction means 24 being provided in each bearing member 23 for the shafts. The ring 21 of each end member is bolted to the housing by the bolts 20 as shown more particularly in Figure 3. The spark plugs 9 are carried by the plates 18. The rotor is provided with a plurality of slots 25 which are substantially tangentially arranged and pass through the periphery of the rotor and the periphery of the rotor is rounded transversely to conform to the arcuate or curved shape of the inner wall of the housing 2 and each portion of the rotor between a pair of slots has a groove 26 therein spaced from its outer end and sectional compression strips 27 are arranged in these grooves, the ends of the strips overlapping as shown at 28 and an expansion spring 29 is seated in each groove and tends to press the sectional strips outwardly into engagement with the blades and into engagement with the plates 18. The blades are shown at B and are slidably arranged in the slots 25 of the rotor and the side walls of each slot are recessed as at 30 for receiving the rollers 31 for engaging side faces of the blades and the inner portion of each blade carries the rollers 32 for engaging the side walls of the slots so as to reduce friction between the blades and the walls of the slots.

Pins 33 are threaded in the inner end walls of each slot and extend into holes 34 in the inner end of each blade and coiled springs 35 are placed on the pins and bear against the inner ends of the blades for forcing said blades outwardly so as to hold the outer end against the internal wall of the housing. A cap member 36 is fastened to the outer end of each blade and has an arcuate outer edge for tightly fitting the arcuate inner wall of the housing, the cap member being fastened to the outer end of the blade by the bolts 37.

Each blade is formed of two sections and the inner edges of these sections are so formed as to provide a wedge-shaped opening between the sections, the large end of the opening being located adjacent the inner end of the blade but spaced therefrom to leave small inwardly projecting parts 38 at the inner ends of the two sections. The small end of the wedge-shaped opening passes through the central portion of the cap member 36 and the side walls of this opening having grooves 39 therein. A wedge member 40 fits in the wedge opening and a spring strip 41 rests on the projections 38 and has its ends curved to form spring parts which press against the large and inner end of the wedge member and tend to press it upwardly and this movement tends to press the two sections of the blade outwardly to keep the outer edges of the two sections bearing against the outer walls of the grooves 17 in the flanges 14 and against the side plates 18. The wedge member has ribs 42 on its side edges fitting in the grooves 39 as shown more particularly in Figure 8. As will be understood, this wedge member acts to automatically take up wear between the side edges of the blade and the side walls formed by the flanges 14 and the plates 18 and the springs 35 keep the outer ends of the blade bearing against the internal wall of the housing 2 so that this arrangement together with the spring pressed strips 27 prevent leakage from the spaces between the pairs of blades. As shown more particularly in Figure 6 the blades slope forwardly or in the direction of movement of the rotor and the outer edge of each of the cap members 36 is beveled as shown at 43 to compensate for this slope of the blades.

As will be seen in Figure 6 during the rotary movement of the rotor as a blade enters a pocket 5 which is in communication with the inlet port 8 it will be moved outwardly by the springs to engage the walls of the pocket and as it passes through the pocket a suction will be formed in the pocket to draw in an explosive mixture through the port 8 and the mixture previously drawn in will be compressed between this blade and the next blade in front of it and then when said front blade passes into the pocket containing the spark plug the compressed mixture will flow into said pocket and then be ignited and then the gases resulting from this ignition will act on said front blade to press the same forwardly and thus impart rotary movement to the rotor. As the forward blade passes the exhaust ports 10 the exhaust gases will flow therefrom and, of course, the next following blade will act to force the exhaust gases through the ports.

Of course, the same action will occur as the blades pass the second inlet port and the second spark plug and it will be understood that the motor can be provided with any desired number of firing pockets and inlet pockets as desired though an exhaust port must be located between each firing pocket and inlet pocket.

This motor will have high compression and it will hold the compression so that the motor will run smoothly at both high and idling speed and the angle of the blades will reduce friction at high speed.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A rotary motor comprising a housing including a ring-shaped part and side parts, a rotor in the housing having substantially tangentially arranged slots therein with the slots sloping in the direction of movement of the rotor, blades in the slots, springs for pressing the blades outwardly, pockets formed in the inner circumference of the ring, means for introducing explosive mixture into some of the pockets, firing means in other of the pockets, said ring having exhaust ports located between the firing pockets and the inlet pockets, each part of the rotor between a pair of slots having a groove therein adjacent its outer end, said groove passing through the side walls of said part and the end walls formed by the slots, spring-pressed compression strips in said last-mentioned groove and each blade being formed of two sections, the inner edges of the two sections forming a wedge-shaped opening, the large end of which is located adjacent the inner end of the blade, a wedge-shaped member in the opening, spring means in the inner end of the opening for pressing the wedge-shaped member outwardly to expand the two sections of the blades against the side members, a pair of flanged shafts, the flanges of which are fastened to the sides of the rotor and pass through openings in the side members of the housing, means for rotatably supporting the shafts and the flanges of the shafts having grooves on their inner faces for receiving portions of the side edges of the blades, and rollers carried by the side walls of the slots in the rotor and by the blades for preventing friction between the blades and the walls of the slots.

2. In a rotary motor including a housing and a slotted rotor in the housing, blades slidably arranged in the slots and each blade being formed of two sections, the inner edges of the two sections being spaced apart and the major portions of said edges being beveled to form a wedge-shaped opening the large end of which is located in spaced relation to the inner end of the blade and the small end of the wedge-shaped opening passing through the outer end of the blade, said inner end of the blade having inwardly extending projections on the inner side walls of the two sections, a wedge-shaped member in the opening, said wedge-shaped member being of substantially the same thickness as that of the blade and spring means resting upon the projections and engaging the large end of the wedge-shaped member.

ROY C. BOYER.